UNITED STATES PATENT OFFICE.

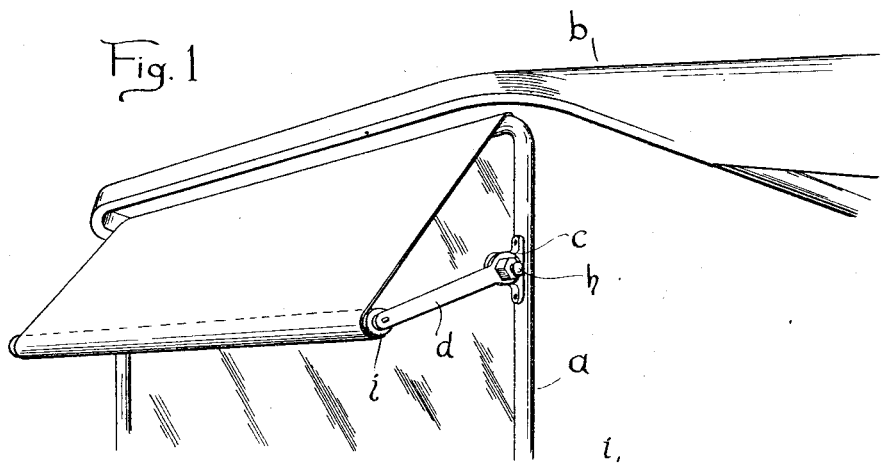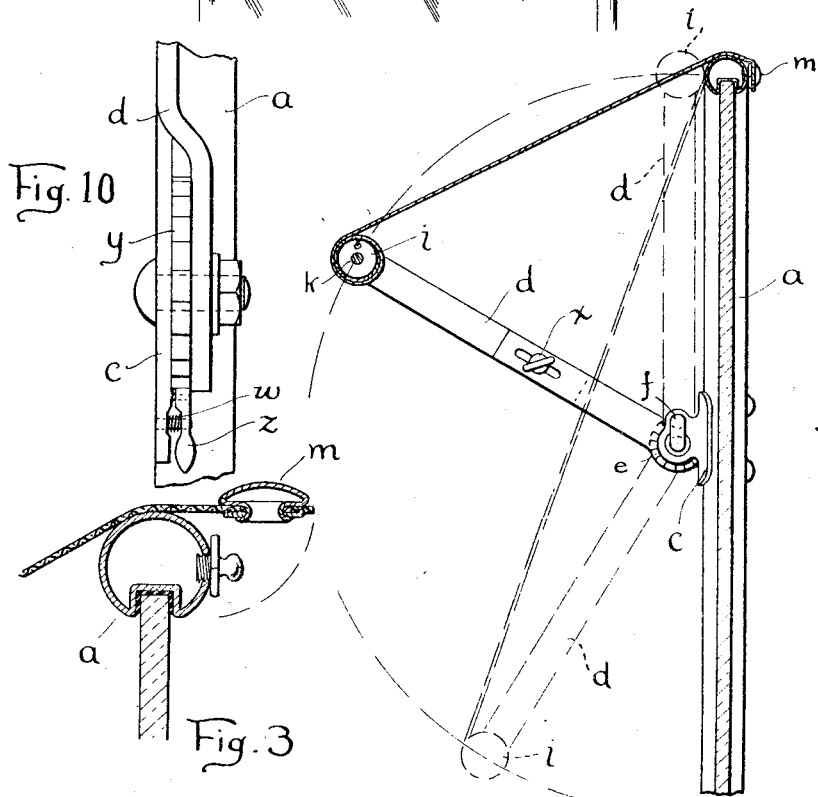

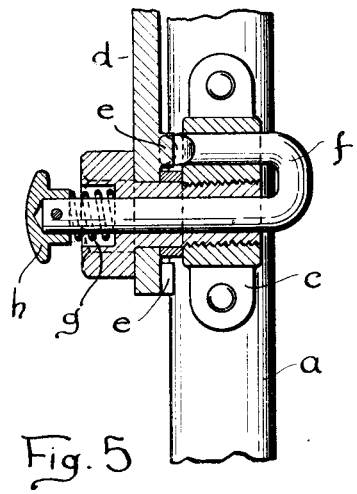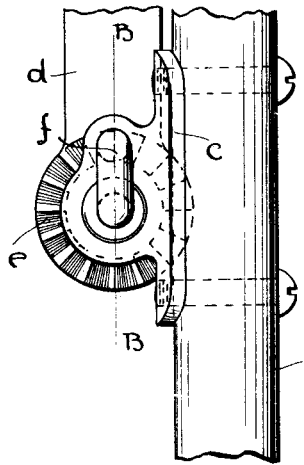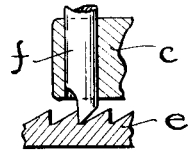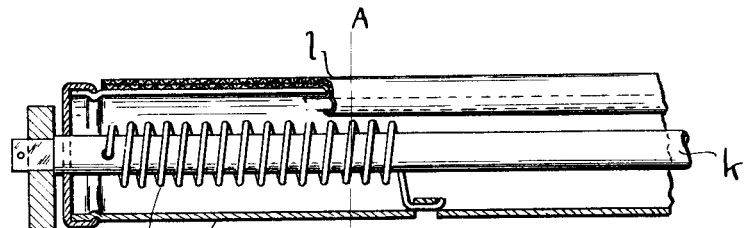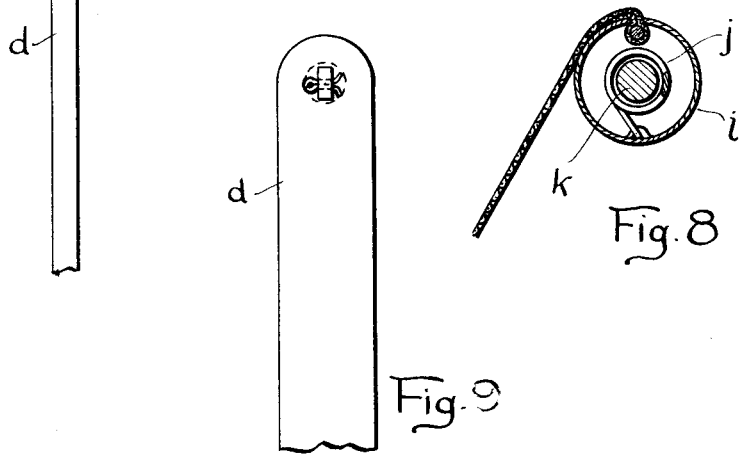

WILLIAM GILBERT ACRE AND EDWARD H. WYATT, OF DETROIT, MICHIGAN; SAID WYATT ASSIGNOR TO ELLIS ACRE, OF DETROIT, MICHIGAN.

AUXILIARY FRONT.

1,181,715.   Specification of Letters Patent.   Patented May 2, 1916.

Application filed December 5, 1913. Serial No. 804,847.

*To all whom it may concern:*

Be it known that we, WILLIAM GILBERT ACRE and EDWARD H. WYATT, citizens of the United States, residing at Detroit, county of Wayne, State of Michigan, have invented a certain new and useful Improvement in Auxiliary Fronts, and declare the following to be a full, clear, and exact description of the same, such as will enable others skilled in the art to which it pertains to make and use the same, reference being had to the accompanying drawings, which form a part of this specification.

This invention relates to auxiliary fronts for carriages.

It has for its object an auxiliary front which can be dropped to different positions in front of the windshield so as to shield that member from snow, sleet or rain when necessary. This keeps a certain part of the shield dry in order not to obscure the vision. The auxiliary front may be lowered by hand and then by pressing the release members the front automatically stows itself away.

In the drawings, Figure 1, is a perspective of the top of the wind-shield and a part of the vehicle top showing the auxiliary front in position for service. Fig. 2 is a vertical section through the windshield and the auxiliary front showing in dotted lines different positions that may be assumed by the auxiliary front. This figure shows a modified form of arms. Fig. 3, is a sectional detail of the fastening device. Fig. 4, is an elevational detail of the ratchet and dog which holds the arms in different positions of adjustment. Fig. 5, is a section on the line B—B of Fig. 4. Fig. 6, is a detail of the dog and the ratchet teeth. Fig. 7, is a fragmentary view of the curtain roll with one of the arms shown partly in section. Fig. 8, is a section on the line A—A, Fig. 7. Fig. 9, is a detail of one of the arms. Fig. 10, is a front elevation of a modified form of locking device.

The wind-shield is designated $a$ and the vehicle top $b$. A pair of clips $c$ are attached to the front of the wind-shield and these are adapted to pivotally support the arms $d$. Fig. 2 shows a modified form of arms that are adjustable lengthwise by reason of being made in two parts provided with slots and a screw $x$ protruding through the slots. The portion of the arm adjacent the pivoting is notched to form a ratchet $e$ which engages with the dog $f$. This dog is a hook-like member as shown in Fig. 5. The spring $g$ ordinarily keeps the button $h$ pressed outward and thereby keeps the point of the dog in engagement with the ratchet teeth. A dog and ratchet is used on each side of the wind-shield.

By pulling the arms $d$ downward the dogs slide over the backs of the teeth and drop into any notches that may be desired. When the buttons $h$ are pressed the dogs are released from the ratchet teeth and curtain roll $i$ begins to roll up due to the energy stored in the spiral spring $j$. The spring $j$ is attached at one end to the shaft $k$ and at the other end to the roll $i$, as shown in Fig. 7.

A weather-excluding fabric, or web $l$, is fastened in any convenient way to the curtain roll and passes from the curtain roll up over the top of the wind-shield to which it is fastened by the spring buttons $m$. When the arms are released the curtain roll begins to revolve and winds the weather excluding fabric, or web, $l$ about its periphery and thereby automatically lifts the arms $d$ to the position shown in the dotted lines of Fig. 2. In this position the device is completely out of the way and the normal view through the wind-shield is not obstructed. This device may not only be applied to the wind-shield but also to the front of limousines, coupés, or other carriages.

The dog and ratchet shown in detail in Figs. 4, 5, and 6 protrudes at the sides of the wind-shield and hence cannot be used with some forms of shields, as the protruding portions are in the way. To avoid this objection we employ a form of ratchet $y$ (Fig. 10) that is attached or integral with the end of the arm $d$. A pawl $z$ is pivoted to the clip $c$ and pressed up against the ratchet teeth by the spring $w$. This pawl and ratchet are carried on the front of the wind-shield bar $a$ and none of the parts protrude to any distance at the side of the shield.

In the drawings we have shown the clips $c$ riveted fast to the wind-shield bar $a$, but it will be understood that they could be clamped on so as to be adjustable there-along.

What we claim is:

The combination with a vehicle provided with a wind shield, a flexible web secured at one end at the top of the wind shield, a pair of arms pivoted to the wind shield frame and which carry the other end of the flexible web, a spring-controlled roll on which one end of the web is secured and constantly tending to wind due to the spring action in said roll, a ratchet on the pivoted end of one of the arms, and a dog on the wind shield frame engaging said ratchet, the said dog and ratchet normally tending to resist the tendency of the spring controlled roll to wind the flexible web and raise the arms.

In testimony whereof, we sign this specification in the presence of two witnesses.

WILLIAM GILBERT ACRE.
EDWARD H. WYATT.

Witnesses:
STUART C. BARNES,
VIRGINIA C. SPRATT.